(12) United States Patent
Cao

(10) Patent No.: US 11,615,607 B2
(45) Date of Patent: Mar. 28, 2023

(54) CONVOLUTION CALCULATION METHOD, CONVOLUTION CALCULATION APPARATUS, AND TERMINAL DEVICE

(71) Applicant: Shenzhen Intellifusion Technologies Co., Ltd., Guangdong (CN)

(72) Inventor: Qingxin Cao, Guangdong (CN)

(73) Assignee: Shenzhen Intellifusion Technologies Co., Ltd., Guangdong (CN)

(\*) Notice: Subject to any disclaimer, the term of this patent is extended or adjusted under 35 U.S.C. 154(b) by 0 days.

(21) Appl. No.: 17/623,894

(22) PCT Filed: Oct. 27, 2020

(86) PCT No.: PCT/CN2020/124087
§ 371 (c)(1),
(2) Date: Dec. 30, 2021

(87) PCT Pub. No.: WO2021/135571
PCT Pub. Date: Jul. 8, 2021

(65) Prior Publication Data
US 2022/0351490 A1    Nov. 3, 2022

(30) Foreign Application Priority Data
Dec. 31, 2019    (CN) .......................... 201911410634.3

(51) Int. Cl.
*G06V 10/44* (2022.01)
*G06V 10/82* (2022.01)
(Continued)

(52) U.S. Cl.
CPC ............ *G06V 10/454* (2022.01); *G06V 10/82* (2022.01)

(58) Field of Classification Search
CPC .......................... G06V 10/454; G06V 10/82
See application file for complete search history.

(56) References Cited

U.S. PATENT DOCUMENTS

| 10,706,350 B1* | 7/2020 | Tran ....................... G06N 3/04 |
| 2016/0070950 A1* | 3/2016 | Chen .................... G06K 9/6272 382/133 |

(Continued)

FOREIGN PATENT DOCUMENTS

| CN | 107437110 A | 12/2017 |
| CN | 108268931 A | 7/2018 |

(Continued)

*Primary Examiner* — John W Lee

(57) ABSTRACT

The present application provides a convolution calculation method, a convolution calculation apparatus, a terminal device, and a computer readable storage medium. The method includes: inputting an image to be processed into a deep learning model, and obtaining a to-be-blocked convolution group and a target size of a block from all convolution layers of the deep learning model; blocking all input channel data of a first to-be-blocked convolution layer in said convolution group according to the target size, a size of each block being the target size; obtaining an output result of said convolution group according to all blocks of all input channel data of said first convolution layer; inputting the output result of said convolution group to a specified network of the deep learning model. Sizes of blocks of the to-be-blocked convolution layer and bandwidth consumption can be adjusted to adapt to frequently updating and upgrading the deep learning model.

7 Claims, 4 Drawing Sheets

(51) Int. Cl.
*G06N 3/08* (2006.01)
*G06N 3/04* (2006.01)

(56) References Cited

U.S. PATENT DOCUMENTS

2019/0147332 A1* 5/2019 Lagudu ................. G06F 1/3296
                                                                706/25
2020/0401898 A1* 12/2020 Varia ........................ G06N 3/08

FOREIGN PATENT DOCUMENTS

CN          108765247  A    11/2018
WO         2019233812 A1   12/2019

* cited by examiner

CONVOLUTION CALCULATION METHOD, CONVOLUTION CALCULATION APPARATUS, AND TERMINAL DEVICE

CROSS REFERENCE TO RELATED APPLICATIONS

This application is a national phase entry under 35 U.S.C. § 371 of International Application No. PCT/CN2020/124087, filed on Oct. 27, 2020, which claims priority to Chinese Patent Application No. 201911410634.3, filed on Dec. 31, 2019, the entire contents of all of which are incorporated herein by reference.

BACKGROUND

1. Technical Field

The present disclosure generally relates to the technical field of deep learning, and especially relates to a convolution calculation method, a convolution calculation apparatus, a terminal device, and a computer readable storage medium.

2. Description of Related Art

Deep learning is to learn an intrinsic law and indication hierarchy of sample data, and information obtained in the learning process is very helpful to interpret data such as characters, images and sounds. A deep learning model usually includes convolution layers, how to save data handling and power consumption is a key point to affect a convolution calculation efficiency of the convolution layers. In this way, a bandwidth bottleneck is easily occurred due to poor data reuse. Once a conventional convolution calculation method is completely designed, the power consumption is determined and a data reuse mode can't be adjusted, in this way, different deep learning models, with different efficiency performance, will be difficult to adapt to current situations that the deep learning models are frequently updated and upgraded.

SUMMARY

The technical problems to be solved: in view of the shortcomings of the related art, the present disclosure provides a convolution calculation method, a convolution calculation apparatus, a terminal device, and a computer readable storage medium which can reduce bandwidth consumption and frequently updating and upgrading of a self-adaptive deep learning model by adjusting sizes of blocks of a to-be-blocked convolution layer.

In a first aspect, a convolution calculation method according to an embodiment of the present disclosure includes:
obtaining a to-be-processed image;
inputting the to-be-processed image into a deep learning model;
for the to-be-processed image, obtaining a to-be-blocked convolution group and a target size of blocks from all convolution layers of the deep learning model; wherein the to-be-blocked convolution group includes N adjacent convolution layers, and N is an integer greater than 1;
blocking all input channel data of a first to-be-blocked convolution layer of the to-be-blocked convolution group, according to the target size, wherein a size of each block is equal to the target size;
obtaining an output result of the to-be-blocked convolution group, according to all the blocks of all the input channel data of the first to-be-blocked convolution layer; and
inputting the output result of the to-be-blocked convolution group into a specified network of the deep learning model, wherein the specified network is a network positioned behind the to-be-blocked convolution group in the deep learning model.

In a second aspect, a convolution calculation apparatus according to an embodiment of the present disclosure includes:
an image obtaining module configured to obtain a to-be-processed image;
an image input module configured to input the to-be-processed image into a deep learning model;
a parameter obtaining module configured to: for the to-be-processed image, obtain a to-be-blocked convolution group and a target size of blocks from all convolution layers of the deep learning model; wherein the to-be-blocked convolution group includes N adjacent convolution layers, and N is an integer greater than 1;
a channel blocking module configured to block all input channel data of a first to-be-blocked convolution layer of the to-be-blocked convolution group, according to the target size, wherein a size of each block is equal to the target size;
a result obtaining module configured to obtain an output result of the to-be-blocked convolution group, according to all the blocks of all the input channel data of the first to-be-blocked convolution layer; and
a result input module configured to input the output result of the to-be-blocked convolution group into a specified network of the deep learning model, wherein the specified network is a network positioned behind the to-be-blocked convolution group in the deep learning model.

In a third aspect, a terminal device according to an embodiment of the present disclosure includes a memory, a processor and computer programs stored in the memory and performed by the processor to implement steps of the convolution calculation method above mentioned in the first aspect.

In a fourth aspect, a computer readable storage medium according to an embodiment of the present disclosure is configured to store computer programs performed by a processor to implement steps of the convolution calculation method above mentioned in the first aspect.

In a fifth aspect, a computer program product according to an embodiment of the present disclosure is configured to be performed by a terminal device to implement steps of the convolution calculation method above mentioned in the first aspect.

As can be seen from the above, when the to-be-processed image is processed (such as identified and tracked) by the deep learning model, obtaining the target size of blocks and the to-be-blocked convolution group from all the convolution layers of the deep learning model; blocking all the input channel data of the first to-be-blocked convolution layer of the to-be-blocked convolution group, according to the target size; and completely performing convolution calculation on the to-be-blocked convolution group, according to all the blocks of all the input channel data of the first to-be-blocked convolution layer. In this way, data does not need to be repeatedly read from the memory in the convolution calculation process, which can reduce data access from the memory, improve the convolution calculation efficiency, and a processing efficiency of the to-be-processed image. At the same time, the to-be-blocked convolution layer can be blocked, according to the target size adaptive to the deep learning model, so that a data bandwidth and a parameter bandwidth occupied in the convolution calculation process can be reduced, to avoid the adaptive deep learning model from being updated and upgraded frequently.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Figure 1:
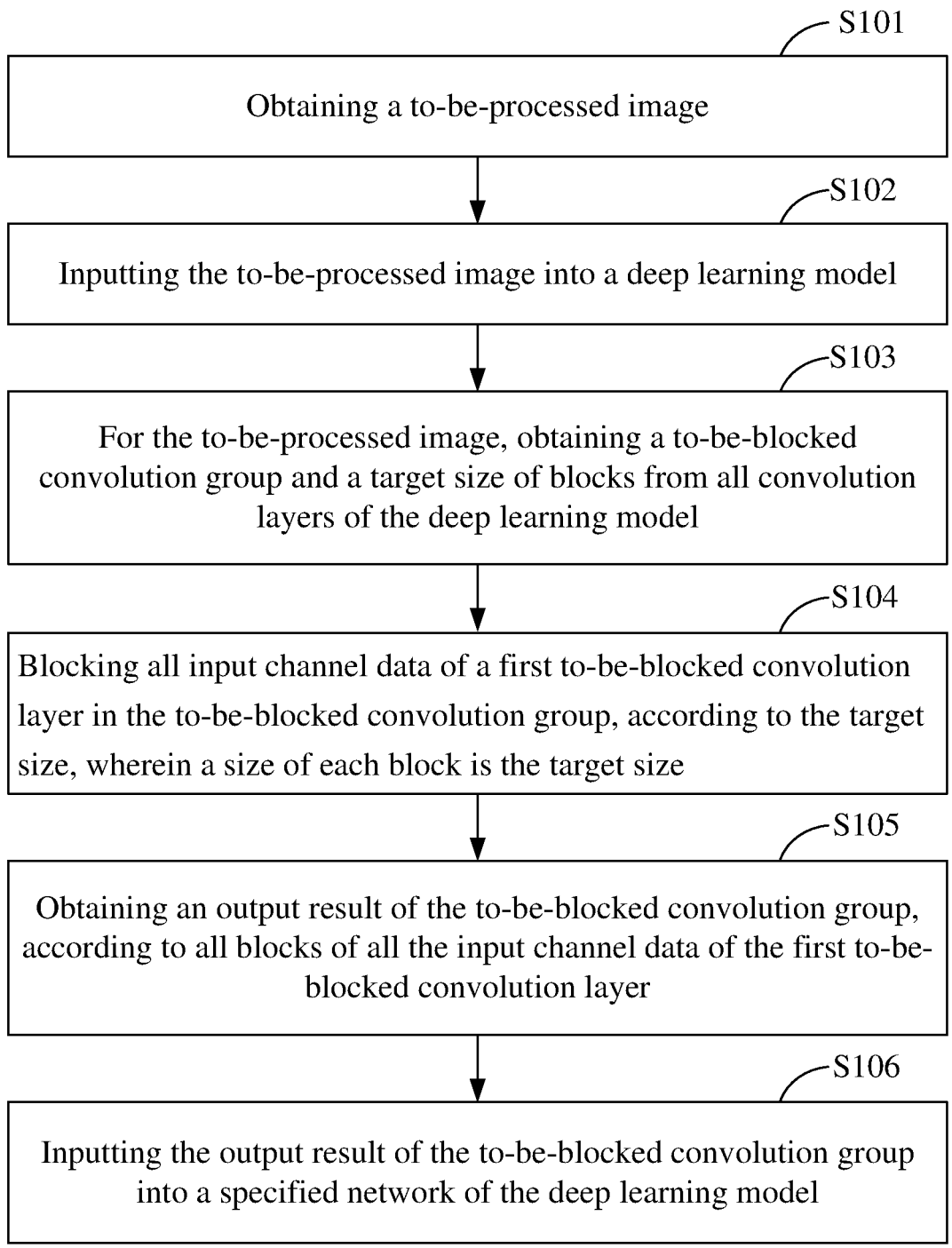
FIG. 1 is a flowchart of a convolution calculation method in accordance with an embodiment of the present disclosure.

Referring to FIG. 1, a flowchart of a convolution calculation method in accordance with an embodiment of the present disclosure is provided and includes the following steps:

step S101, obtaining a to-be-processed image.

The to-be-processed image can be an image that is processed (e.g., identified and tracked, etc.) by a deep learning model, for example, a photo that a category of the photo can be recognized as a portrait by the deep learning model.

step S102, inputting the to-be-processed image into a deep learning model.

step S103, for the to-be-processed image, obtaining a to-be-blocked convolution group and a target size of blocks from all convolution layers of the deep learning model.

The to-be-blocked convolution group includes N adjacent convolution layers, wherein N is an integer greater than 1.

In an embodiment of the present disclosure, the deep learning model (e.g., a convolutional neural network) usually includes at least two convolution layers configured to perform feature extraction on input channel data and abstract a relevance implied in the input channel data. A first convolution layer (i.e. a first layer of convolution layer) of the at least two convolution layers usually extracts some low-level features (such as edges, lines corners, etc.), and more layers of convolution layers can iteratively extract more complex features from the low-level features.

Optionally, the step of obtaining, for the to-be-processed image, the to-be-blocked convolution group and the target size of the blocks from all the convolution layers of the deep learning model, includes:

obtaining M groups of different alternative parameters, wherein a group of alternative parameters includes an alternative convolution group and an alternative size corresponding to the alternative convolution group, and M is an integer greater than 1;

for the to-be-processed image, obtaining a data bandwidth and a parameter bandwidth occupied by each group of alternative parameters in the M groups of different alternative parameters during a convolution calculation process; and obtaining an alternative parameter with a minimum sum of the data bandwidth and the parameter bandwidth from the M groups of different alternative parameters, and determining the alternative convolution group in the alternative parameter as the to-be-blocked convolution group, wherein the alternative size of the alternative parameter is equal to the target size.

In an embodiment of the present disclosure, the M groups of different alternative parameters can be preset. For the alternative convolution group in each group of alternative parameters and the alternative size corresponding to the alternative convolution group, obtaining the alternative convolution group from all the convolution layers of the deep learning model, according to the above alternative size (i.e. an alternative size corresponding to the alternative convolution group); blocking all input channel data of a first alternative convolution layer in the above alternative convolution group, the size of each block is the alternative size. According to all blocks of all input channel data of the first alternative convolution layer, completely performing convolution calculation on the alternative convolution group, and obtaining the data bandwidth (that is, the data bandwidth occupied in the convolution calculation process by the group of alternative parameters composed of the alternative convolution group and the alternative size), and the parameter bandwidth (that is, the parameter bandwidth occupied by the group of alternative parameters composed of the alternative convolution group and the alternative size in the convolution calculation process) occupied in the convolution calculation process.

Optionally, the step of obtaining the data bandwidth occupied by each group of alternative parameters in the M groups of different alternative parameters during the convolution calculation process, includes:

obtaining a bandwidth occupied by each group of alternative parameters for loading the input channel data from a memory during the convolution calculation process, and determining the bandwidth as the data bandwidth occupied by each group of alternative parameters during the convolution calculation process.

Optionally, the step of the parameter bandwidth occupied by each group of alternative parameters in M groups of different alternative parameters during the convolution calculation process, includes:

obtaining a bandwidth occupied by each group of alternative parameters for loading a convolution kernel from a weight cache or the memory during the convolution calculation process, and determining the bandwidth as the parameter bandwidth occupied by each group of alternative parameters during the convolution calculation process, wherein the weight cache is a cache for storing the convolution kernel.

step S104, blocking all the input channel data of the first to-be-blocked convolution layer of the to-be-blocked convolution group, according to the target size, wherein the size of each block is equal to the target size.

In an embodiment of the present disclosure, all the input channel data of the first to-be-blocked convolution layer can be obtained, according to the to-be-processed image. Specifically, obtaining all the input channel data of the to-beprocessed image, if the first to-be-blocked convolution layer of the to-be-blocked convolution group is a first convolution layer of the neural network, input channel data of the to-be-processed image is determined to be all the input channel data of the first to-be-blocked convolution layer; if the first to-be-blocked convolution layer of the to-be-blocked convolution group is a g-th (g is an integer larger than 1) convolution layer in the neural network, all output channel data of a (g-1)-th convolution layer in the neural network is determined to all the input channel data of the first to-be-blocked convolution layer, and all the output channel data of the (g-1)-th convolution layer in the neural network are obtained according to all output channel data of a previous layer network (namely, a network before the (g-1)-th convolution layer), that is, all the output channel data is finally obtained according to all the input channel data of the to-be-processed image. For example, the neural network includes five convolution layers in total, a third convolution layer, a fourth convolution layer and a fifth convolution layer are as the to-be-blocked convolution group, in this way, the third convolution layer in the neural network is the first to-be-blocked convolution layer of the to-be-blocked convolution group, the fourth convolution layer in the neural network is a second to-be-blocked convolution layer in the to-be-blocked convolution group, and the fifth convolution layer in the neural network is a third to-be-blocked convolution layer (i.e. the last to-be-blocked convolution layer) in the to-be-blocked convolution group. At this time, all the input channel data of the first to-be-blocked convolution layer of the to-be-blocked convolution group, is all output channel data of the second convolution layer in the neural network, all the output channel data of the second convolution layer in the neural network are obtained by performing convolution calculation on all the output channel data of the first convolution layer in the neural network, all the output channel data of the first convolution layer in the neural network are obtained by performing convolution calculation on all the input channel data of the to-be-processed image.

When blocking all the input channel data of the first to-be-blocked convolution layer, a blocking rule of each input channel data of the first to-be-blocked convolution layer is the same, and the size of each block is equal to the target size.

Optionally, before blocking all the input channel data of the first to-be-blocked convolution layer of the to-be-blocked convolution group, the method further includes:

obtaining all the input channel data of the first to-be-blocked convolution layer from the memory.

In an embodiment of the present disclosure, the memory can be a memory of the terminal device, including but not limited to, a double data rate synchronous dynamic random access memory (DDR SDRAM) and a static random access memory (SRAM). The DDR SDRAM is an SDRAM with a double data transmission rate, a data transmission speed of the DDR SDRAM is twice a clock frequency of a system, so that transmission performances of the DDR SDRAM are better than a conventional SDRAM, due to the increase of the speed. The SRAM is a memory with a static access function, and configured to store data without refreshing electric power thereof. The terminal device obtains an image of the to-be-input deep learning model through a high-speed interface, and stores the image in the memory. output channel data of each network (for example, a convolution layer, an input layer before the first to-be-blocked convolution layer) before the first to-be-blocked convolution layer in the deep learning model is also usually stored in the memory, so that all the input channel data of the first to-be-blocked convolution layer need to be obtained from the memory.

Figure 2A:
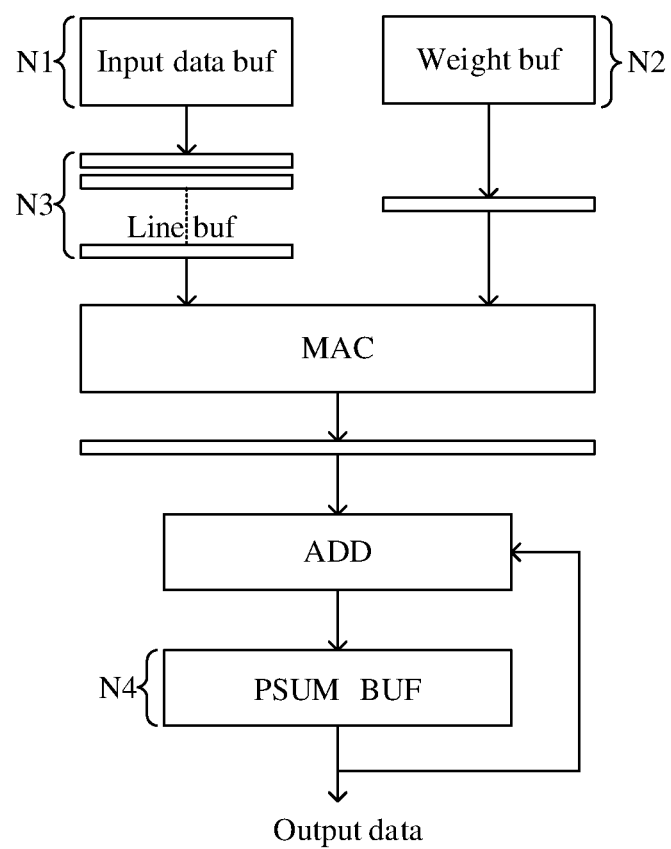
FIG. 2a is a block diagram of performing convolution calculation on a to-be-blocked convolution layer in accordance with an embodiment of the present disclosure.

FIG. 2a is a block diagram of performing convolution calculation on the to-be-blocked convolution layer in accordance with an embodiment of the present disclosure. Input data buf shown in FIG. 2a represents a buffer of the input channel data, with data from the memory and a deep of N1 that can be flexibly configured according to design requirements. Weight buf represents a buffer of an input weight (namely a weight buffer), with data from the memory and a deep of N2 that can be flexibly configured according to design requirements. Line buf, with the number of rows of N3 that can be flexibly configured, represents a register memory between the Input data buf and an MAC, and configured to store data rows that are performing calculation. The MAC is configured to perform multiplication and accumulation and output an intermediate result of the partial sum; an ADD is configured to perform accumulation on the partial sum, to obtain a final output result. A PSUM BUF is configured to cache data of the partial sum, with a deep of N4 that can be flexibly configured according to design requirements. Output data represents output channel data.

step S105, obtaining an output result of the to-be-blocked convolution group, according to all blocks of all the input channel data of the first to-be-blocked convolution layer.

Optionally, the step of obtaining the output result of the to-be-blocked convolution group, according to all the blocks of all the input channel data of the first to-be-blocked convolution layer, includes:

obtaining an output result of the last to-be-blocked convolution layer in the to-be-blocked convolution group, according to all the blocks of all the input channel data of the first to-be-blocked convolution layer, and determining the output result of the last to-be-blocked convolution layer as the output result of the to-be-blocked convolution layer.

In an embodiment of the present disclosure, the to-be-blocked convolution layer located between the first to-be-blocked convolution layer, and the last to-be-blocked convolution layer in the to-be-blocked convolution group, can be iterated in the cache, according to all the blocks of all the input channel data of the first to-be-blocked convolution layer, and the output result of the last to-be-blocked convolution layer can be obtained without needing to access data from the memory of the terminal device, which can reduce data access from the memory in the convolution process. The output result of the last to-be-blocked convolution layer can be all output channel data of the last to-be-blocked convolution layer.

In an embodiment of the present disclosure, after the output result of the last to-be-blocked convolution layer in the to-be-blocked convolution group is obtained, the output result of the last to-be-blocked convolution layer can be stored in the memory, so that the network positioned after the last to-be-blocked convolution layer can obtain the output result of the last to-be-blocked convolution layer from the memory; the output result of the last to-be-blocked convolution layer is taken as an input of the network, so as to conveniently processing subsequent networks in the deep learning model.

Optionally, the step of obtaining the output result of the last to-be-blocked convolution layer in the to-be-blocked convolution group, according to all the blocks of all the input channel data of the first to-be-blocked convolution layer, includes:

step a1, performing convolution calculation on an i-th block of all the input channel data of the first to-be-blocked convolution layer, to obtain the i-th block of all the output channel data of the first to-be-blocked convolution layer, wherein i is an integer greater than zero and less than or equal to a total number of the blocks, and the total number of blocks refers to the total number of blocks of the input channel data after all the input channel data of the first to-be-blocked convolution layer are blocked;

step a2, obtaining the i-th block of all the output channel data of the last to-be-blocked convolution layer, according to the i-th block of all the output channel data of the first to-be-blocked convolution layer; and repeating the steps a1 and a2 until all blocks of all the output channel data of the last to-be-blocked convolution layer are obtained, and determining all the blocks of all the output channel data of the last to-be-blocked convolution layer as the output result of the last to-be-blocked convolution layer.

In an embodiment of the present disclosure, when obtaining all the blocks of all the output channel data of the last to-be-blocked convolution layer, obtaining one block of all the output channel data of the last to-be-blocked convolution layer, according to one block of all the input channel data of the first to-be-blocked convolution layer, and then obtaining another block of all the output channel data of the last to-be-blocked convolution layer, according to another block of all the input channel data of the first to-be-blocked convolution layer, and so on, until all the blocks of all the input channel data of the first to-be-blocked convolution layer are completely traversed, all the blocks of all the output channel data of the last to-be-blocked convolution layer can be obtained.

Optionally, the step of obtaining the i-th block of all the output channel data of the last to-be-blocked convolution layer, according to the i-th block of all the output channel data of the first to-be-blocked convolution layer, includes:

step b, performing convolution calculation on the i-th block of all output channel data of a (j-1)-th to-be-blocked convolution layer in the to-be-blocked convolution group, to obtain the i-th block of all output channel data of a j-th to-be-blocked convolution layer in the to-be-blocked convolution group, wherein j is an integer greater than one and less than or equal to N; and repeating the step b until the i-th block of all the output channel data of the last to-be-blocked convolution layer is obtained.

In an embodiment of the present disclosure, the i-th block of all the output channel data of the first to-be-blocked convolution layer is taken as the i-th block of all input channel data of a second to-be-blocked convolution layer, performing convolution calculation on the i-th block of all the input channel data of the second to-be-blocked convolution layer, to obtain the i-th block of all output channel data of the second to-be-blocked convolution layer; the i-th block of all the output channel data of the second to-be-blocked convolution layer is taken as the i-th block of all input channel data of a third to-be-blocked convolution layer, and so on, until the i-th block of all output channel data of a previous to-be-blocked convolution layer of the last to-be-blocked convolution layer is taken as the i-th block of all the input channel data of the last to-be-blocked convolution layer, performing convolution calculation on the i-th block of all the input channel data of the last to-be-blocked convolution layer, to obtain the i-th block of all the output channel data of the last to-be-blocked convolution layer. According to the method for obtaining the i-th block of all the output channel data of the last to-be-blocked convolution layer, all the blocks of all the output channel data of the last to-be-blocked convolution layer can be obtained.

For example, the to-be-blocked convolution group includes three to-be-blocked convolution layers, output channel data of a first to-be-blocked convolution layer is input channel data of a second to-be-blocked convolution layer, output channel data of the second to-be-blocked convolution layer is input channel data of a third to-be-blocked convolution layer, the three to-be-blocked convolution layers are each segmented into four blocks. When obtaining blocks of all output channel data of the third to-be-blocked convolution layer, first performing convolution calculation on a first block of all input channel data of the first to-be-blocked convolution layer, to obtain the first block of all the output channel data of the first to-be-blocked convolution layer; taking the first block of all the output channel data of the first to-be-blocked convolution layer as the first block of all input channel data of the second to-be-blocked convolution layer, and performing convolution calculation on the first block of all the input channel data of the second to-be-blocked convolution layer, to obtain the first block of all the output channel data of the second to-be-blocked convolution layer; taking the first block of all the output channel data of the second to-be-blocked convolution layer as the first block of all the input channel data of the third to-be-blocked convolution layer, and performing convolution calculation on the first block of all the input channel data of the third to-be-blocked convolution layer, to obtain the first block of all the output channel data of the third to-be-blocked convolution layer. And then, performing convolution calculation on a second block of all input channel data of the first to-be-blocked convolution layer, to obtain the second block of all output channel data of the first to-be-blocked convolution layer, taking the second block of all the output channel data of the first to-be-blocked convolution layer as the second block of all input channel data of the second to-be-blocked convolution layer, and performing convolution calculation on the second block of all the input channel data of the second to-be-blocked convolution layer, to obtain the second block of all output channel data of the second to-be-blocked convolution layer; taking the second block of all the output channel data of the second to-be-blocked convolution layer as the second block of all input channel data of the third to-be-blocked convolution layer, and performing convolution calculation on the second block of all the input channel data of the third to-be-blocked convolution layer, to obtain the second block of all output channel data of the third to-be-blocked convolution layer. Furthermore, performing convolution calculation on a third block of all input channel data of the first to-be-blocked convolution layer, to obtain the third block of all output channel data of the first to-be-blocked convolution layer, taking the third block of all the output channel data of the first to-be-blocked convolution layer as the third block of all input channel data of the second to-be-blocked convolution layer, and performing convolution calculation on the third block of all the input channel data of the second to-be-blocked convolution layer, to obtain the third block of all output channel data of the second to-be-blocked convolution layer; taking the third block of all the output channel data of the second to-be-blocked convolution layer as the third block of all input channel data of the third to-be-blocked convolution layer, and performing convolution calculation on the third block of all the input channel data of the third to-be-blocked convolution layer, to obtain the third block of all output channel data of the third to-be-blocked convolution layer. Finally, performing convolution calculation on a fourth block of all input channel data of the first to-be-blocked convolution layer, to obtain the fourth block of all output channel data of the first to-be-blocked convolution layer, taking the fourth block of all the output channel data of the first to-be-blocked convolution layer as the fourth block of all input channel data of the second to-be-blocked convolution layer, and performing convolution calculation on the fourth block of all the input channel data of the second to-be-blocked convolution layer, to obtain the fourth block of all output channel data of the second to-be-blocked convolution layer; taking the fourth block of all the output channel data of the second to-be-blocked convolution layer as the fourth block of all input channel data of the third to-be-blocked convolution layer, and performing convolution calculation on the fourth block of all the input channel data of the third to-be-blocked convolution layer, to obtain the fourth block of all output channel data of the third to-be-blocked convolution layer. The first block, the second block, the third block and the fourth block of all the output channel data of the third to-be-blocked convolution layer, are all blocks of all the output channel data of the third to-be-blocked convolution layer.

Optionally, the step of performing convolution calculation on the i-th block of all the output channel data of the (j-1)-th to-be-blocked convolution layer in the to-be-blocked convolution group, to obtain the i-th block of all the output channel data of the j-th to-be-blocked convolution layer in the to-be-blocked convolution group, includes:

performing convolution calculation on the i-th block of all the output channel data of the (j-1)-th to-be-blocked convolution layer, and convolution kernels corresponding to all the output channel data of the j-th to-be-blocked convolution layer, to obtain the i-th block of all the output channel data of the j-th to-be-blocked convolution layer.

The number of output channel data of one to-be-blocked convolution layer is the same as the number of convolution kernels of the to-be-blocked convolution layer, for example, if the number of convolution kernels of one to-be-blocked convolution layer is two, all input channel data of the to-be-blocked convolution layer are respectively convolved with the two convolution kernels, to obtain two output channel data.

Optionally, for each of the first N-1 to-be-blocked convolution layers in the to-be-blocked convolution group, after the i-th block of all output channel data of each to-be-blocked convolution layer is obtained, the method further includes:

storing the i-th block of all the output channel data of each to-be-blocked convolution layer in an output cache;

before performing convolution calculation on the i-th block of all the output channel data of each to-be-blocked convolution layer, the method further includes:

obtaining the i-th block of all the output channel data of each to-be-blocked convolution layer, from the output cache.

In an embodiment of the present disclosure, when each to-be-blocked convolution layer in the to-be-blocked convolution group obtains one block of its own all output channel data, the block can be stored in the output cache (i.e., a cache for storing the block of the output channel data), rather than storing in the memory, so that the number of data access from the memory can be reduced. When the to-be-blocked convolution layer obtains the block of its own all output channel data, it needs to use blocks of all output channel data of the previous to-be-blocked convolution layer, to store the blocks of all the output channel data of the previous to-be-blocked convolution layer in the cache, in this way, the blocks of all the output channel data of the previous to-be-blocked convolution layer can be obtained directly from the cache without accessing the memory, under needing to use the above blocks.

Figure 2B:
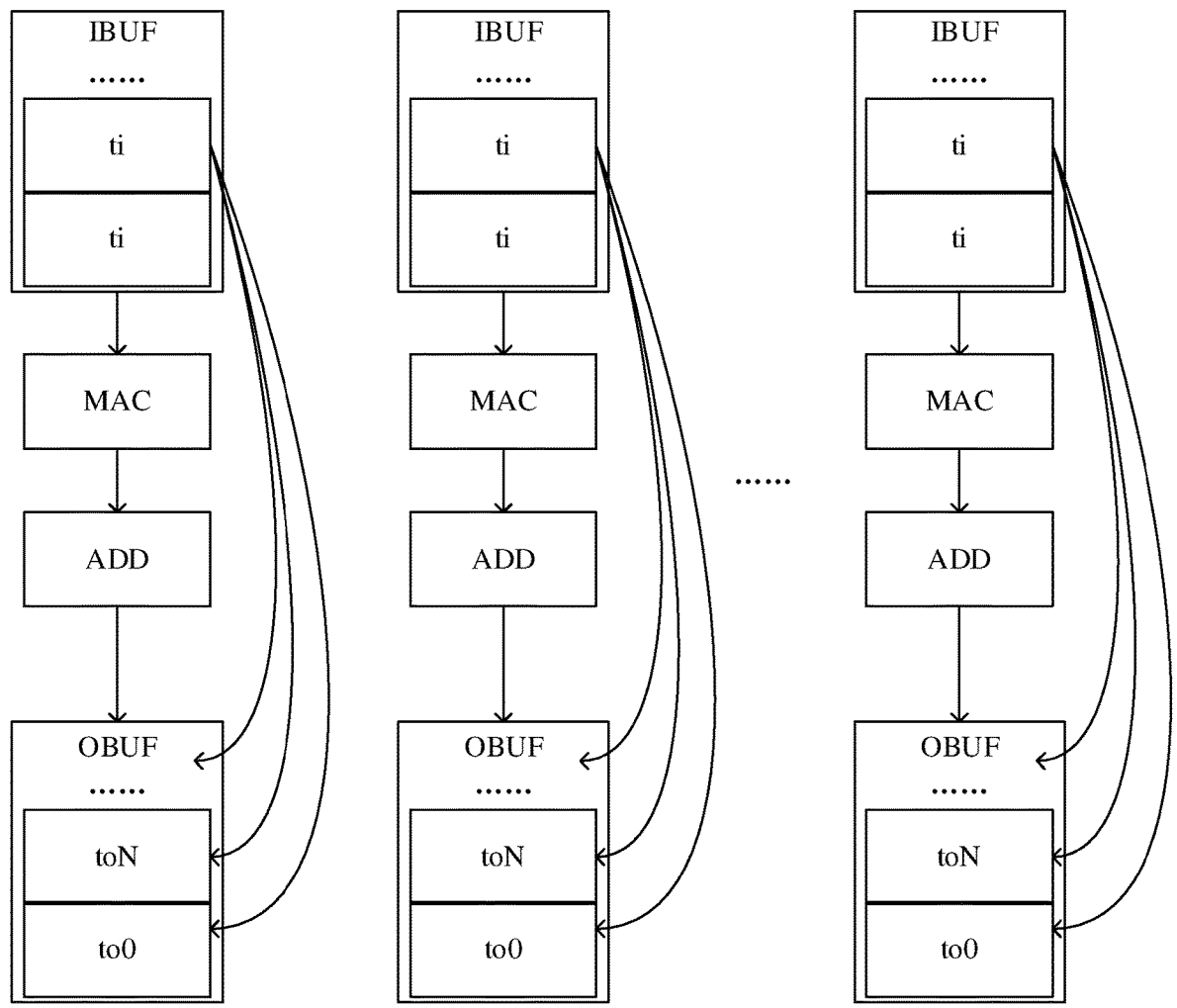
FIG. 2b is a block diagram of caching blocks of the to-be-blocked convolution layer in accordance with an embodiment of the present disclosure.

FIG. 2b is a block diagram of caching blocks of the to-be-blocked convolution layer in accordance with an embodiment of the present disclosure. M1 tis (i.e., blocks of the input channel data) can be stored in an IBUF (i.e., the Input data buf in FIG. 2a), wherein M1 depends on a deep of the IBUF and a size of ti; M2 tos (i.e. blocks of the output channel data) can be stored in an OBUF (i.e. the PSUM BUF in FIG. 2a), M2 depending on a deep of the OBUF and a size of the to; parameter data of M3 convolution kernels can be stored in an WBUF (i.e. the Weight buf in FIG. 2a), M3 depending on a deep of the WBUF and a size of the convolution kernel; taking one ti from the IBUF, then successively calculating to0~toN until the ti is completely used up, and then discarding the ti; the WBUF provides N convolution kernels for convolution calculation; a plurality of tis can be performed convolution computation in parallel by a computation module.

By adjusting sizes of the blocks of all the input channel data of the first to-be-blocked convolution layer of the to-be-blocked convolution group, all sizes of the blocks of all the output channel data of the first to-be-blocked convolution layer, sizes of blocks of all input channel data of residual to-be-blocked convolution layers in the to-be-blocked convolution group, and sizes of blocks of all the output channel data can be adjusted, so as to further adjust the data bandwidth and the parameter bandwidth thereof.

For the to-be-blocked convolution layer, if the smaller the size of the block of the output channel data of the to-be-blocked convolution layer is, the more the blocks of the output channel data can be stored in the OBUF in parallel, and the higher the blocks of the input channel data of the to-be-blocked convolution layer can be reused, which is equivalent to that the consumption speed of the block of the input channel data of the to-be-blocked convolution layer is slower, so that the data bandwidth consumption of the block of the input channel data of the to-be-blocked convolution layer is reduced. However, data calculated and reused by each convolution kernel is reduced, and the data needs to be read from the WBUF or the memory repeatedly, so that the parameter bandwidth consumption is increased. If the greater the size of the block of the output channel data of the to-be-blocked convolution layer is, the fewer the blocks of the output channel data can be stored in the OBUF in parallel, and the less the blocks of the input channel data can be reused, which is equivalent to that the consumption speed of the block of the input channel data is slower, so that the data bandwidth consumption of the block of the input channel data of the to-be-blocked convolution layer is increased. However, data calculated and reused by each convolution kernel is increased, so as to reduce to repeatedly read the data from the WBUF or the memory, and reduce the parameter bandwidth consumption. Therefore, the data bandwidth consumption and the parameter bandwidth consumption can be adaptively adjusted by selecting a proper size of the block and a proper to-be-blocked convolution group, so as to reduce the total bandwidth consumption. For example, for the first to-be-blocked convolution layer, if the size of the input image is large and there are few input channels and output channels, the number of input data of the input channels is large, and the number of convolution kernels is small, blocks of output channel data with smaller sizes can be selected. It is ideal that all the blocks of all the output channel data can be stored in the OBUF, and each block of the input channel data can be reused to the blocks of all the output channel data, in this way, the input channel data needs to be loaded from the memory only once. If the size of the input image is small and there are more input channels and output channels, the number of input data of the input channels is small, and the number of convolution kernels is large, blocks of output channel data with larger sizes can be selected. It is ideal that the blocks do not need to be segmented, so that each convolution kernel can be reused to all data of a corresponding output channel, the data can be discarded after being used up, and the whole convolution kernel is loaded from the memory only once. The size of the block of the output channel data can be adjusted by adjusting the size of the block of the input channel data of the first to-be-blocked convolution layer.

step S106, inputting the output result of the to-be-blocked convolution group into a specified network of the deep learning model.

The specified network refers to the network behind the to-be-blocked convolution group in the deep learning model, that is, the network behind the to-be-blocked convolution layer in the to-be-blocked convolution group of the deep learning model, such as a pooling layer, a full connection layer, etc.

As can be seen from the above, when the to-be-processed image is processed (such as identified and tracked) by the deep learning model, obtaining the target size of blocks and the to-be-blocked convolution group from all the convolution layers of the deep learning model; blocking all the input channel data of the first to-be-blocked convolution layer of the to-be-blocked convolution group, according to the target size; and completely performing convolution calculation on the to-be-blocked convolution group, according to all the blocks of all the input channel data of the first to-be-blocked convolution layer. In this way, data does not need to be repeatedly read from the memory in the convolution calculation process, which can reduce data access from the memory, improve the convolution calculation efficiency, and a processing efficiency of the to-be-processed image. At the same time, the to-be-blocked convolution layer can be blocked, according to the target size adaptive to the deep learning model, so that a data bandwidth and a parameter bandwidth occupied in the convolution calculation process can be reduced, to avoid the adaptive deep learning model from being updated and upgraded frequently.

Figure 3:
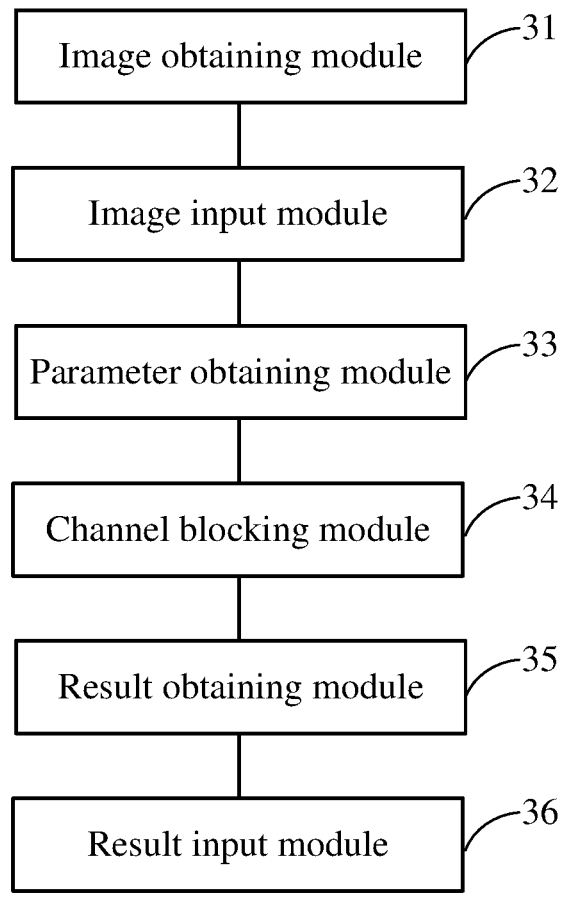
FIG. 3 is a block diagram of a convolution calculation apparatus in accordance with an embodiment of the present disclosure.

Referring to FIG. 3, a block diagram of a convolution calculation apparatus in accordance with an embodiment of the present disclosure is provided, and only relevant portions of the embodiment are shown for ease of illustration.

The convolution calculation apparatus includes:

an image obtaining module 31 configured to obtain a to-be-processed image;

an image input module 32 configured to input the to-be-processed image into a deep learning model;

a parameter obtaining module 33 configured to: for the to-be-processed image, obtain a to-be-blocked convolution group and a target size of blocks from all convolution layers of the deep learning model; wherein the to-be-blocked convolution group includes N adjacent convolution layers, and N is an integer greater than 1;

a channel blocking module 34 configured to block all input channel data of a first to-be-blocked convolution layer of the to-be-blocked convolution group, according to the target size, wherein a size of each block is equal to the target size;

a result obtaining module 35 configured to obtain an output result of the to-be-blocked convolution group, according to all blocks of all the input channel data of the first to-be-blocked convolution layer; and a result input module 36 configured to input the output result of the to-be-blocked convolution group into a specified network of the deep learning model, wherein the specified network is a network positioned behind the to-be-blocked convolution group in the deep learning model.

Optionally, the parameter obtaining module 33 includes:

a first obtaining sub-module configured to obtain M groups of different alternative parameters, wherein a group of alternative parameters includes an alternative convolution group and an alternative size corresponding to the alternative convolution group, and M is an integer greater than 1;

a second obtaining sub-module configured to obtain a data bandwidth and a parameter bandwidth occupied by each group of alternative parameters in the M groups of different alternative parameters during a convolution calculation process; and a parameter processing sub-module configured to obtain an alternative parameter with a minimum sum of the data bandwidth and the parameter bandwidth from the M groups of different alternative parameters, and determine the alternative convolution group in the alternative parameter as the to-be-blocked convolution group, wherein the alternative size of the alternative parameter is equal to the target size.

Optionally, the second obtaining sub-module is specifically configured to:

obtain a bandwidth occupied by each group of alternative parameters for loading the input channel data from a memory during the convolution calculation process, and determine the bandwidth as the data bandwidth occupied by each group of alternative parameters during the convolution calculation process; and obtain a bandwidth occupied by each group of alternative parameters for loading a convolution kernel from a weight cache or a memory during the convolution calculation process, and determine the bandwidth as the parameter bandwidth occupied by each group of alternative parameters during the convolution calculation process, wherein the weight cache is a cache for storing the convolution kernel.

Optionally, the result obtaining module 35 is specifically configured to:

obtain an output result of the last to-be-blocked convolution layer in the to-be-blocked convolution group, according to all the blocks of all the input channel data of the first to-be-blocked convolution layer, and determine the output result of the last to-be-blocked convolution layer as the output result of the to-be-blocked convolution layer.

Optionally, the result obtaining module 35 specifically includes:

a convolution calculation sub-module configured to perform convolution calculation on an i-th block of all the input channel data of the first to-be-blocked convolution layer, to obtain the i-th block of all output channel data of the first to-be-blocked convolution layer, wherein i is an integer greater than zero and less than or equal to a total number of the blocks, and the total number of blocks refers to the total number of blocks of the input channel data after all the input channel data of the first to-be-blocked convolution layer are blocked;

a block obtaining sub-module configured to obtain the i-th block of all output channel data of the last to-be-blocked convolution layer, according to the i-th block of all the output channel data of the first to-be-blocked convolution layer; and a block processing sub-module configured to repeatedly perform the convolution calculation sub-module and the block obtaining sub-module until all the blocks of all the output channel data of the last to-be-blocked convolution layer are obtained, and determining all the blocks of all the output channel data of the last to-be-blocked convolution layer as the output result of the last to-be-blocked convolution layer.

Optionally, the block obtaining sub-module includes:

a first obtaining unit configured to perform convolution calculation on the i-th block of all output channel data of a (j-1)-th to-be-blocked convolution layer in the to-be-blocked convolution group, to obtain the i-th block of all output channel data of a j-th to-be-blocked convolution layer in the to-be-blocked convolution group, wherein j is an integer greater than one and less than or equal to N; and a second obtaining unit configured to repeatedly perform the first obtaining unit until the i-th block of all the output channel data of the last to-be-blocked convolution layer is obtained.

Optionally, the first obtaining unit is specifically configured to:

perform convolution calculation on the i-th block of all the output channel data of the (j-1)-th to-be-blocked convolution layer, and convolution kernels corresponding to all the output channel data of the j-th to-be-blocked convolution layer, to obtain the i-th block of all the output channel data of the j-th to-be-blocked convolution layer.

Optionally, the block obtaining sub-module includes:

a storage unit configured to: for each of the first N-1 to-be-blocked convolution layers in the to-be-blocked convolution group, store the i-th block of all output channel data of each to-be-blocked convolution layer in an output cache, after the i-th block of all the output channel data of each to-be-blocked convolution layer is obtained;

a third obtaining unit configured to obtain the i-th block of all the output channel data of each to-be-blocked convolution layer, from the output cache, before performing convolution calculation on the i-th block of all the output channel data of each to-be-blocked convolution layer.

The convolution calculation apparatus provided in the embodiment of the present disclosure can be applied to the convolution calculation method of the first embodiment mentioned above, therefore, specific functions and technical effects brought by the above devices/units are detailed in the first embodiment of the present method, which will not be repeated here.

Figure 4:
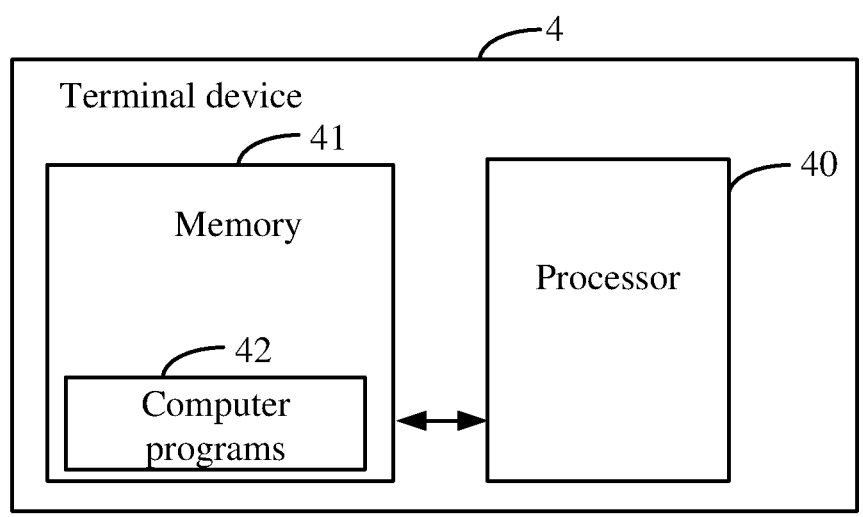
FIG. 4 is a block diagram of a terminal device in accordance with an embodiment of the present disclosure.

FIG. 4 is a schematic diagram of a terminal device in accordance with an embodiment of the present disclosure. Referring to FIG. 4, the terminal device includes: one or more processors 40 (only one is shown in FIG. 4), a memory 41 and computer programs 42 stored in the memory 41 and performed by the processor 40 to implement steps in the embodiment of the convolution calculation method above mentioned.

The terminal device 4 can be a computing device such as a desktop computer, a notebook, a handheld computer and a cloud server. The terminal device 4 can include, but is not limited to, the processor 40 and the memory 41. It can be understood for an ordinary skilled person in the art that: FIG. 4 is only an example of the terminal device 4, but is not limited thereto, the terminal device 4 can include more or less components than illustrated in FIG. 4, or some combination of components, or different components. For example, the terminal device 4 can also include input/output devices, network access devices, buses, etc.

The processor 40 can be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor can be a microprocessor or any conventional processors, etc.

The memory 41 can be an internal storage unit within the terminal device 4, such as a hard disk or a memory of the terminal device 4. The memory 41 can also be an external storage device of the terminal device 4, such as a plug-in hard disk, a Smart Media Card (SMC), a Secure Digital (SD) Card, and a Flash Card, etc. equipped on the terminal device 4. Furthermore, the memory 41 can also include both an internal storage unit of the terminal device 4 and an external storage device. The memory 41 is configured to store computer programs and other programs and data required by the terminal device 4, and temporarily store data that has been output or to be output.

One of ordinary skill in the related art can be clearly understood that: for convenient and simple description, the above functional units and modules are only split to illustrate with examples. In a practical application, different functional units and modules can be assigned to implement the above functions according to needs, that is, internal structures of the apparatus can be split into different functional units or modules to complete all or part of the functions described above. Each functional unit or each module in embodiments of the present disclosure can be integrated in a processing unit, or each unit can physically exist separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

In the above embodiments, the description of each embodiment has its own emphasis, and parts without detailed description in one embodiment can be referred to relevant description of other embodiments.

One of ordinary skill in the related art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

It should be understood that the disclosed apparatus/terminal device and method in the embodiments provided by the present disclosure can be implemented in other ways. For example, the embodiments of the apparatus/terminal device described above are merely schematic; for example, the splitting of the modules or units is merely a splitting of logical functions, which can also be realized in other ways; for example, multiple units or components can combined or integrated into another system, or some features can be ignored or not implemented. On the other hand, the coupling, direct coupling or communication connection shown or discussed can be achieved through some interfaces, indirect coupling or communication connection between devices or units can electrical, mechanical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, each functional unit in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

The integrated modules/units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes, a recording medium, a U disk, a mobile hard disk drive, a diskette or a CD-ROM, a computer Memory, a Read-Only Memory (ROM), a Random Access Memory (RAM), an electrical carrier signal, a telecommunication signal and a software distribution medium, etc. It should be noted that content contained in the computer readable storage medium can be added or reduced as appropriate to the requirements of legislation and patent practice within the jurisdictions, for example, in some jurisdictions, in accordance with legislation and patent practice, computer readable storage medium do not include electrical carrier signals and telecommunications signals.

All or part steps of the above convolution calculation method as described in embodiments of the present disclosure can be implemented through a computer program product that is configured to be performed by the terminal device to implement steps of the convolution calculation method above mentioned.

What is claimed is:

1. A convolution calculation method comprising:
obtaining a to-be-processed image;
inputting the to-be-processed image into a deep learning model;
for the to-be-processed image, obtaining a to-be-blocked convolution group and a target size of each of blocks from all convolution layers of the deep learning model; wherein the to-be-blocked convolution group comprises N adjacent convolution layers, and N is an integer greater than 1; dividing all input channel data of a first to-be-blocked convolution layer of the to-be-blocked convolution group into the blocks, according to the target size, wherein a size of each block is equal to the target size, the target size comprises a length and width of the block;
obtaining an output result of the to-be-blocked convolution group, according to all blocks of all the input channel data of the first to-be-blocked convolution layer; and
inputting the output result of the to-be-blocked convolution group into a specified network of the deep learning model, wherein the specified network is a network positioned behind the to-be-blocked convolution group in the deep learning model; wherein the step of obtaining, for the to-be-processed image, the to-be-blocked convolution group and the target size of each of blocks from all the convolution layers of the deep learning model comprises:
obtaining M groups of different alternative parameters, wherein a group of alternative parameters comprises an alternative convolution group and an alternative size corresponding to the alternative convolution group, and M is an integer greater than 1;
for the to-be-processed image, obtaining a data bandwidth and a parameter bandwidth occupied by each group of alternative parameters in the M groups of different alternative parameters during a convolution calculation process; and
obtaining an alternative parameter with a minimum sum of the data bandwidth and the parameter bandwidth from the M groups of different alternative parameters, and determining the alternative convolution group in the alternative parameter as the to-be-blocked convolution group, wherein the alternative size of the alternative parameter is equal to the target size.

2. The convolution calculation method as claimed in claim 1, wherein the step of obtaining the data bandwidth occupied by each group of alternative parameters in the M groups of different alternative parameters during the convolution calculation process, comprises:
obtaining a bandwidth occupied by each group of alternative parameters for loading the input channel data from a memory during the convolution calculation process, and determining the bandwidth as the data bandwidth occupied by each group of alternative parameters during the convolution calculation process.

3. The convolution calculation method as claimed in claim 1, wherein the step of obtaining the parameter bandwidth occupied by each group of alternative parameters in the M groups of different alternative parameters during the convolution calculation process, comprises:
obtaining a bandwidth occupied by each group of alternative parameters for loading a convolution kernel from a weight cache or a memory during the convolution calculation process, and determining the bandwidth as the parameter bandwidth occupied by each group of alternative parameters during the convolution calculation process, wherein the weight cache is a cache for storing the convolution kernel.

4. The convolution calculation method as claimed in claim 1, wherein the step of obtaining the output result of the to-be-blocked convolution group, according to all the blocks of all the input channel data of the first to-be-blocked convolution layer, comprises:
obtaining an output result of the last to-be-blocked convolution layer in the to-be-blocked convolution group, according to all the blocks of all the input channel data of the first to-be-blocked convolution layer, and determining the output result of the last to-be-blocked convolution layer as the output result of the to-be-blocked convolution layer.

5. The convolution calculation method as claimed in claim 4, wherein the step of obtaining the output result of the last to-be-blocked convolution layer in the to-be-blocked convolution group, according to all the blocks of all the input channel data of the first to-be-blocked convolution layer, comprises:

step a1, performing convolution calculation on an i-th block of all the input channel data of the first to-be-blocked convolution layer, to obtain the i-th block of all output channel data of the first to-be-blocked convolution layer, wherein i is an integer greater than zero and less than or equal to a total number of the blocks, and a total number of the blocks refers to a total number of the blocks of the input channel data after all the input channel data of the first to-be-blocked convolution layer are blocked;

step a2, obtaining the i-th block of all output channel data of the last to-be-blocked convolution layer, according to the i-th block of all the output channel data of the first to-be-blocked convolution layer; and repeating the steps a1 and a2 until all the blocks of all the output channel data of the last to-be-blocked convolution layer are obtained, and determining all the blocks of all the output channel data of the last to-be-blocked convolution layer as the output result of the last to-be-blocked convolution layer.

6. The convolution calculation method as claimed in claim 5, wherein the step of obtaining the i-th block of all the output channel data of the last to-be-blocked convolution layer, according to the i-th block of all the output channel data of the first to-be-blocked convolution layer, comprises:

step b, performing convolution calculation on the i-th block of all output channel data of a (j-1)-th to-be-blocked convolution layer in the to-be-blocked convolution group, to obtain the i-th block of all output channel data of a j-th to-be-blocked convolution layer in the to-be-blocked convolution group, wherein j is an integer greater than one and less than or equal to N; and repeating the step b until the i-th block of all the output channel data of the last to-be-blocked convolution layer is obtained.

7. A terminal device comprising a memory, a processor and computer programs stored in the memory and performed by the processor to implement a convolution calculation method, the convolution calculation method comprising:

obtaining a to-be-processed image;

inputting the to-be-processed image into a deep learning model;

for the to-be-processed image, obtaining a to-be-blocked convolution group and a target size of each of blocks from all convolution layers of the deep learning model; wherein the to-be-blocked convolution group comprises N adjacent convolution layers, and N is an integer greater than 1; dividing all input channel data of a first to-be-blocked convolution layer of the to-be-blocked convolution group into the blocks, according to the target size, wherein a size of each block is equal to the target size, the target size comprises a length and width of the block;

obtaining an output result of the to-be-blocked convolution group, according to all blocks of all the input channel data of the first to-be-blocked convolution layer; and inputting the output result of the to-be-blocked convolution group into a specified network of the deep learning model, wherein the specified network is a network positioned behind the to-be-blocked convolution group in the deep learning model; wherein the step of obtaining, for the to-be-processed image, the to-be-blocked convolution group and the target size of each of blocks from all the convolution layers of the deep learning model comprises:

obtaining M groups of different alternative parameters, wherein a group of alternative parameters comprises an alternative convolution group and an alternative size corresponding to the alternative convolution group, and M is an integer greater than 1;

for the to-be-processed image, obtaining a data bandwidth and a parameter bandwidth occupied by each group of alternative parameters in the M groups of different alternative parameters during a convolution calculation process; and obtaining an alternative parameter with a minimum sum of the data bandwidth and the parameter bandwidth from the M groups of different alternative parameters, and determining the alternative convolution group in the alternative parameter as the to-be-blocked convolution group, wherein the alternative size of the alternative parameter is equal to the target size.

* * * * *